United States Patent
Naitou

(10) Patent No.: US 10,065,498 B2
(45) Date of Patent: Sep. 4, 2018

(54) POWER TRANSMISSION DEVICE

(71) Applicant: Komatsu Ltd., Tokyo (JP)

(72) Inventor: Shinichi Naitou, Yuki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/322,201

(22) PCT Filed: Apr. 3, 2015

(86) PCT No.: PCT/JP2015/060653
§ 371 (c)(1),
(2) Date: Dec. 27, 2016

(87) PCT Pub. No.: WO2016/002287
PCT Pub. Date: Jan. 7, 2016

(65) Prior Publication Data
US 2017/0129331 A1    May 11, 2017

(30) Foreign Application Priority Data
Jul. 3, 2014   (JP) ................. 2014-138089

(51) Int. Cl.
*B60K 17/04*     (2006.01)
*F16D 55/36*     (2006.01)
(Continued)

(52) U.S. Cl.
CPC ........ *B60K 17/046* (2013.01); *B60B 27/0052* (2013.01); *B60B 27/0073* (2013.01);
(Continued)

(58) Field of Classification Search
CPC ............................................ F16D 2055/0033
(Continued)

(56) References Cited

U.S. PATENT DOCUMENTS 3,301,359 A    1/1967  Cole et al.
5,975,257 A *  11/1999 Roach ............... B62D 5/062
                                              188/264 F
(Continued)

FOREIGN PATENT DOCUMENTS

JP    48-103781 U    3/1972
JP    01-044820 Y2   12/1989
(Continued)

OTHER PUBLICATIONS

International Search Report dated Jun. 30, 2015, issued for PCT/JP2015/060653.

*Primary Examiner* — Mark Alan Manley
(74) *Attorney, Agent, or Firm* — Locke Lord LLP

(57) ABSTRACT

A power transmission device includes: an axle housing having a central hole where a drive shaft is penetrated; a wheel hub disposed in an outer portion of the axle housing via wheel bearings; a speed-reducer housing chamber provided in the wheel hub to cover an opening end portion of the axle housing; a gear speed reducer, formed inside the speed-reducer housing chamber, to decelerate a rotation of the drive shaft and transmit the rotation to the wheel hub; and a wet-type brake mechanism housed in a brake chamber formed between the axle housing and the wheel hub, and actuated such that braking is applied to a rotation of the wheel hub relative to the axle housing. Further, floating seals are disposed between a lubrication space and the speed-reducer housing chamber, and a circulation passage for oil that includes an oil filter is connected to the lubrication space.

4 Claims, 3 Drawing Sheets

(51) Int. Cl.
  *B60B 27/00* (2006.01)
  *F16H 57/04* (2010.01)
  *F16H 57/029* (2012.01)
  *F16D 55/00* (2006.01)
  *F16J 15/34* (2006.01)
  *B60B 27/04* (2006.01)
  *F16D 65/853* (2006.01)

(52) U.S. Cl.
  CPC .............. *B60B 27/04* (2013.01); *F16D 55/36* (2013.01); *F16D 65/853* (2013.01); *F16H 57/029* (2013.01); *F16H 57/04* (2013.01); *F16H 57/0404* (2013.01); *F16H 57/0471* (2013.01); *F16H 57/0473* (2013.01); *F16H 57/0486* (2013.01); *F16J 15/34* (2013.01); *B60B 2380/14* (2013.01); *B60B 2900/513* (2013.01); *B60B 2900/561* (2013.01); *B60B 2900/711* (2013.01); *B60Y 2200/41* (2013.01); *B60Y 2400/42* (2013.01); *B60Y 2400/4244* (2013.01); *F16D 2055/0033* (2013.01); *F16D 2055/0095* (2013.01)

(58) Field of Classification Search
  USPC ....................................................... 192/221.1
  See application file for complete search history.

(56) References Cited

U.S. PATENT DOCUMENTS 7,121,389 B2 * 10/2006 Manrao .................. F15B 11/20
                                                                 188/264 B
2009/0078528 A1   3/2009  Uzawa et al.
2013/0056289 A1   3/2013  Shibukawa et al.

FOREIGN PATENT DOCUMENTS

| JP | 08-074289 A  | 3/1996  |
| JP | 09-264349 A  | 10/1997 |
| JP | 2004-324819 A | 11/2004 |
| JP | 2007-154958 A | 6/2007  |
| JP | 4527778 B2   | 6/2010  |
| JP | 2013-053711 A | 3/2013  |

* cited by examiner

POWER TRANSMISSION DEVICE

FIELD

The present invention relates to a power transmission device applicable to a working vehicle, such as a dump truck, that travels by rotating a vehicle wheel.

BACKGROUND

The power transmission device of this type is generally a power transmission device in which a wheel hub is rotatably disposed in an outer peripheral portion of an axle housing via a wheel bearing. A drive shaft is disposed in a central hole of the axle housing so as to be relatively rotatable to the axle housing. A gear speed reducer, which decelerates a rotation of the drive shaft and transmits the rotation to the wheel hub, is provided between the drive shaft and the wheel hub. In this power transmission device, the drive shaft is rotated by the driving of a driving source, such as an engine or an electric motor, causing the wheel hub to rotate via the gear speed reducer. As a result, a working vehicle can travel by a vehicle wheel attached to the wheel hub.

A brake chamber is provided between the axle housing and the wheel hub. The brake chamber is a space in which a wet multi-plate type brake mechanism, which is formed between the axle housing and the wheel hub, is housed. The brake mechanism applies braking to the rotation of the wheel hub relative to the axle housing when the brake mechanism is actuated. As a result, the traveling working vehicle can be decelerated.

In consideration of a cooling effect, wet-type friction plate and mating plate immersed in oil, serving as heat generation sources, are often applied as the brake mechanism (for example, see Patent Literature 1). In this related art, a floating seal is disposed between the brake chamber that houses the brake mechanism and a space including the wheel bearing in order to divide the two spaces. Meanwhile, a speed-reducer housing chamber that houses the gear speed reducer and the space including the wheel bearing are communicated with each other in order to lubricate the wheel bearing using oil stored in the speed-reducer housing chamber.

CITATION LIST

Patent Literature

Patent Literature 1: Utility Model Application Laid-Open Publication No. S48-103781

SUMMARY

Technical Problem

In the speed-reducer housing chamber that houses the gear speed reducer, there is a possibility that wear powder generated by the meshing of gears is mixed into oil. Therefore, in the power transmission device according to Patent Literature 1, it is necessary to frequently replace the oil in the speed-reducer housing chamber in order to extend a lifetime of the wheel bearing, thus causing maintenance work to become complicated.

Considering the situation described above, the present invention has an object to provide a power transmission device that can extend a lifetime of a wheel bearing without causing maintenance work to become complicated.

Solution to Problem

To attain the above object, a power transmission device according to the present invention includes: an axle housing that has a central hole at a central portion in which a drive shaft is rotatably penetrated; a wheel hub rotatably disposed in an outer peripheral portion of the axle housing via a pair of wheel bearings; a speed-reducer housing chamber provided in the wheel hub in a manner covering an opening end portion of the axle housing; a gear speed reducer that is formed inside the speed-reducer housing chamber, and decelerates a rotation of the drive shaft and transmits the rotation to the wheel hub; and a wet-type brake mechanism housed in a brake chamber formed between the axle housing and the wheel hub, and actuated such that braking is applied to a rotation of the wheel hub relative to the axle housing. Further, floating seals are disposed between a lubrication space, including the brake chamber and the pair of wheel bearings, and the speed-reducer housing chamber, and a circulation passage for oil that includes an oil filter is connected to the lubrication space.

Further, according to the present invention, in the power transmission device described above, the floating seals are disposed at positions in an outer periphery of the wheel bearing.

Further, according to the present invention, in the power transmission device described above, the floating seals are disposed in two positions having radii from a central axis of the drive shaft equal to each other.

Further, according to the present invention, the power transmission device includes an axle housing that has a central hole at a central portion in which a drive shaft is rotatably penetrated; a wheel hub rotatably disposed in an outer peripheral portion of the axle housing via a pair of wheel bearings; a speed-reducer housing chamber provided in the wheel hub in a manner covering an opening end portion of the axle housing; a gear speed reducer that is formed inside the speed-reducer housing chamber, and decelerates a rotation of the drive shaft and transmits the rotation to the wheel hub; and a wet-type brake mechanism housed in a brake chamber formed between the axle housing and the wheel hub, and actuated such that braking is applied to a rotation of the wheel hub relative to the axle housing. Further, the brake chamber is formed in an outer peripheral portion of the wheel hub by providing a brake cover member in the axle housing, a lubrication space, including the brake chamber and the pair of wheel bearings, is formed by disposing first floating seals between the brake cover member and the wheel hub, and second floating seals between an opening end portion, facing the speed-reducer housing chamber in the axle housing, and the wheel hub, and a circulation passage for oil that includes an oil filter is connected to the lubrication space.

Advantageous Effects of Invention

According to the present invention, a circulation passage for oil having an oil filter is connected to a lubrication space including a brake chamber and a wheel bearing. Therefore, it is possible to lubricate the wheel bearing using the constantly purified oil. Moreover, since the flow of oil between a speed-reducer housing space and the lubrication space is blocked, wear powder generated in a gear speed reducer is hardly mixed into a sliding surface of the wheel bearing. As a result, a lifetime of the wheel bearing can be extended without performing complicated maintenance work such as frequent replacement of oil. Furthermore, the oil from the circulation passage is not supplied to the speed-reducer housing space and thus, a portion of the speed reducer immersed in the oil decreases; therefore, a mechanical loss of the gear speed reducer due to the resistance of oil can be minimized.

DESCRIPTION OF EMBODIMENTS

Hereinafter, a preferable embodiment of a power transmission device according to the present invention will be described in detail with reference to the accompanying drawings.

Figure 1:
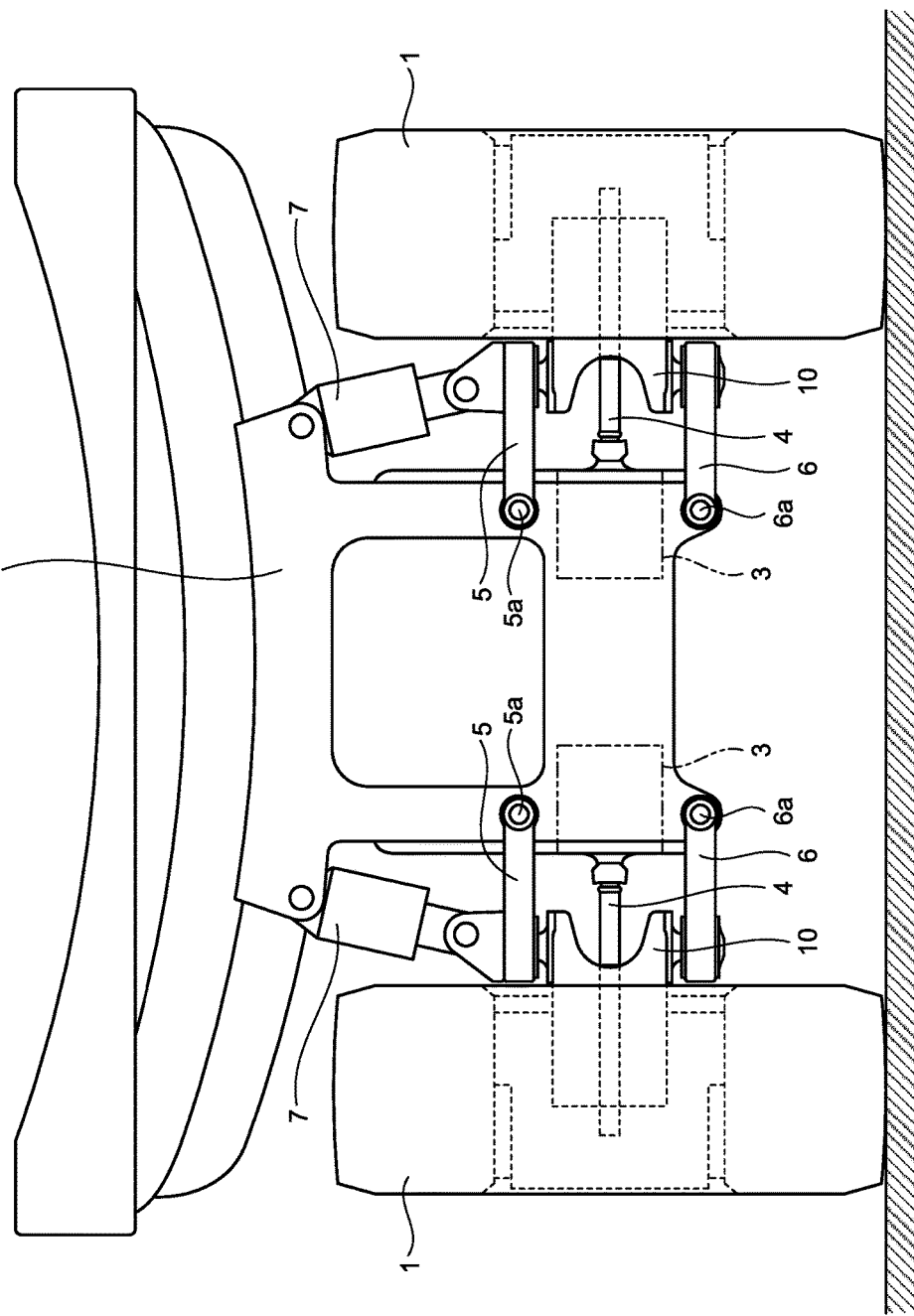
FIG. 1 is a front view of a working vehicle to which a power transmission device according to an embodiment of the present invention is applied.
Figure 2:
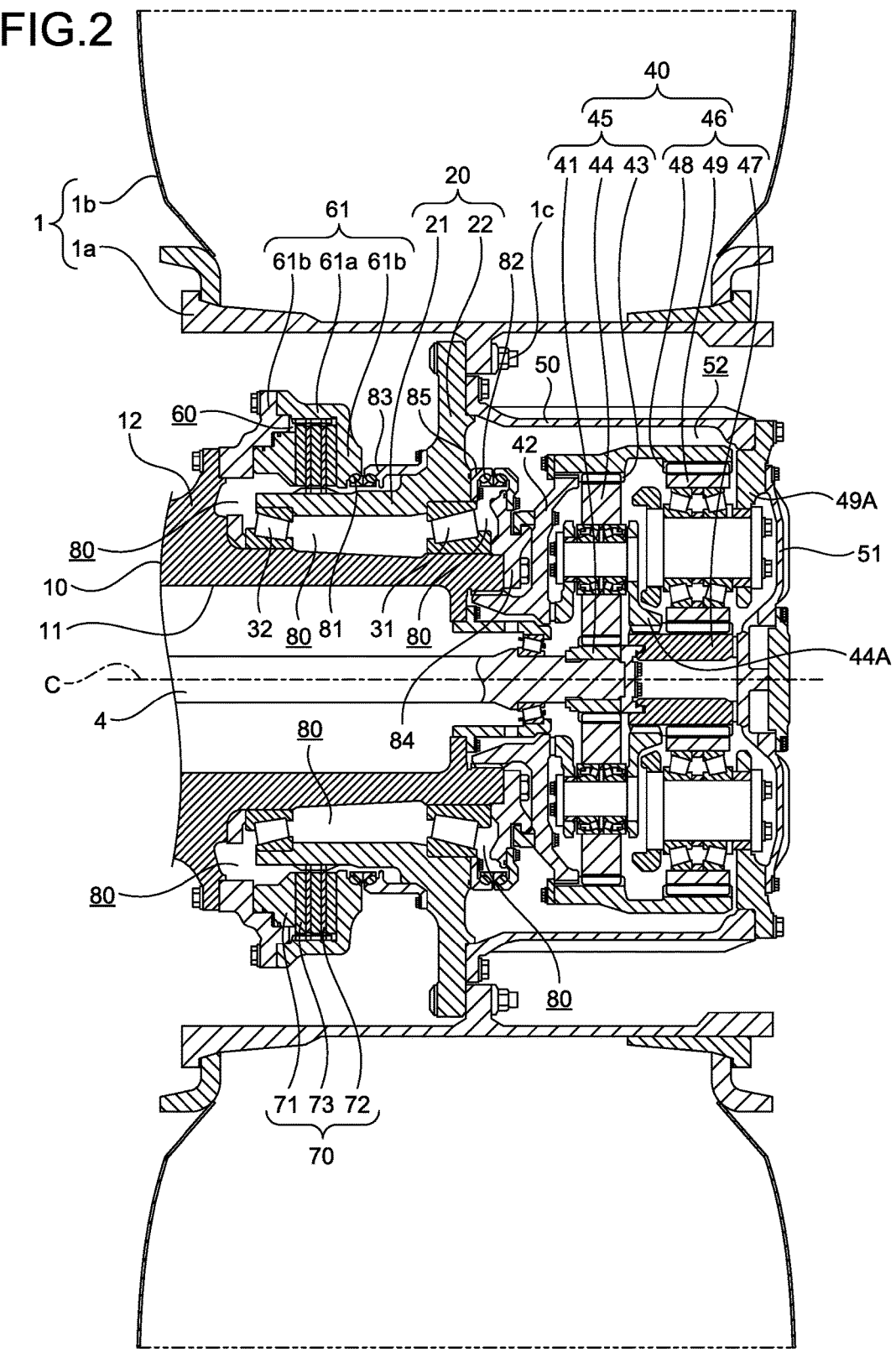
FIG. 2 is a cross-sectional view of a main part of the power transmission device applied to the working vehicle illustrated in FIG. 1.

FIG. 2 illustrates the power transmission device according to an embodiment of the present invention. As illustrated in FIG. 1, the power transmission device exemplified herein is applicable to a four-wheel dump truck that travels by rotating vehicle wheels 1, and is for transmitting a rotation of an electric motor 3, which is mounted on a vehicle body frame 2, to the vehicle wheels 1. Particularly in the present embodiment, there is exemplified the large dump truck with the vehicle wheels 1 each having a diameter of approximately 4 m, and that transports rocks and sediment on off-road such as a mine. The electric motor 3 is provided in each of the vehicle wheels 1, and is mounted on the vehicle body frame 2 in a state in which a central axis C of a drive shaft 4 is provided along a left-right direction. Hereinafter, the structure of the power transmission device that transmits the rotation of the electric motor 3 to the vehicle wheels 1 will be described. Since the structure of the power transmission device is common in all of the four wheels, only one of the four wheels will be described below.

As illustrated in FIGS. 1 and 2, the power transmission device applied to the dump truck described above includes an axle housing 10. The axle housing 10 is a tubular shape having a central hole 11, and is attached to the vehicle body frame 2 via an upper arm 5 and a lower arm 6 in a state where the drive shaft 4 is penetrated in the central hole 11. Base end portions of the upper arm 5 and the lower arm 6 are each rotatably attached via pivots 5a, 6a provided along a front-rear direction of the vehicle body frame 2, and a base end portion of the axle housing 10 is supported between distal end portions of the upper arm 5 and the lower arm 6. A damper cylinder 7 serving as a shock absorber is provided between the upper arm 5 and the vehicle body frame 2.

Figure 3:
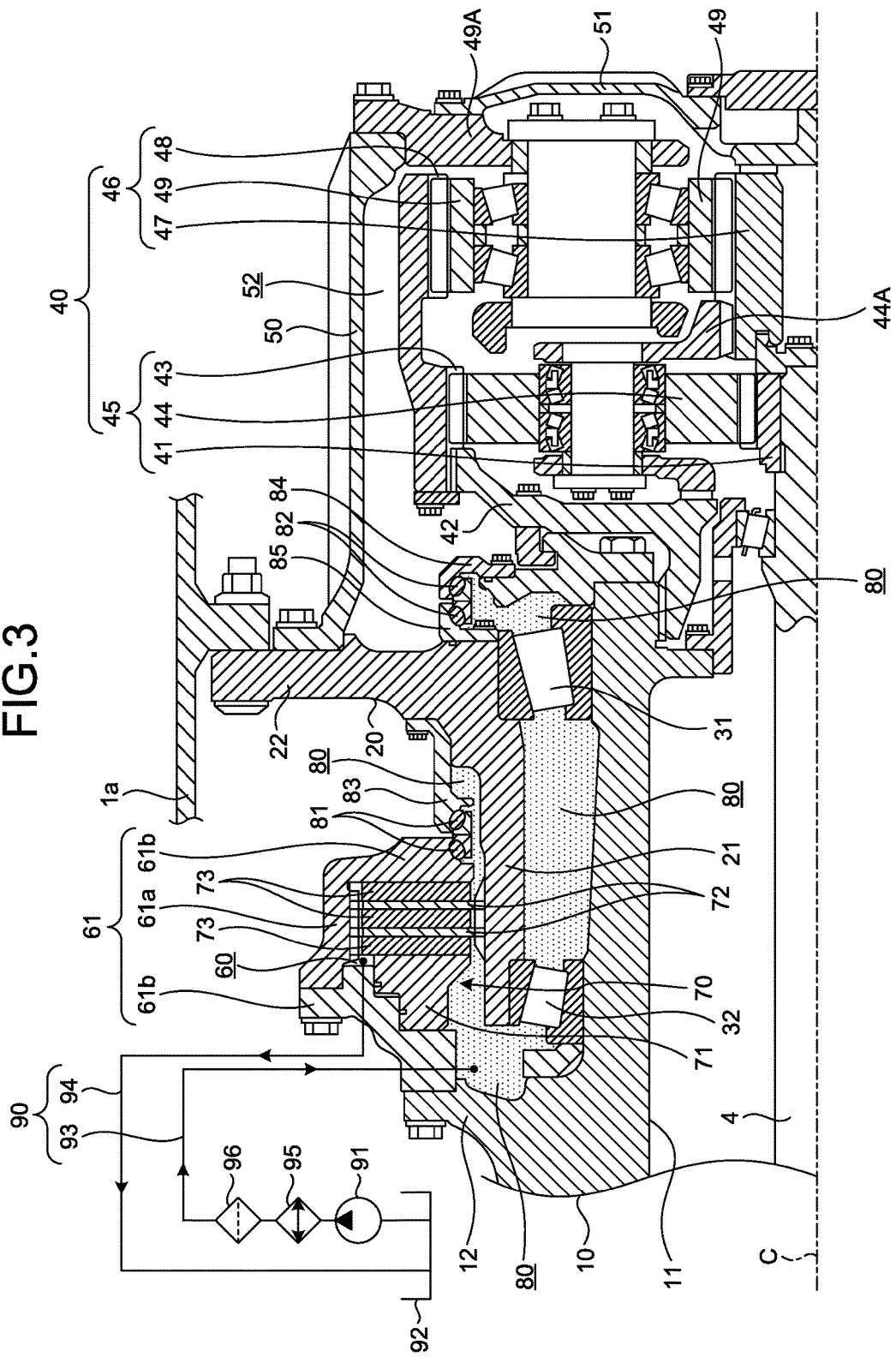
FIG. 3 is an enlarged view of the main part of the power transmission device illustrated in FIG. 2.

A wheel hub 20 is disposed at a distal end portion of the axle housing 10 as illustrated in FIGS. 2 and 3. The wheel hub 20 has a cylindrical-shaped rotation support portion 21, and a disk-shaped hub portion 22 extending from one end portion toward an outer periphery of the rotation support portion 21. By disposing the hub portion 22 at a side of the distal end portion of the axle housing 10 and interposing a pair of wheel bearings 31, 32 between an inner peripheral surface of the rotation support portion 21 and an outer peripheral surface of the axle housing 10, the wheel hub 20 is supported on an outer peripheral portion of the axle housing 10 so as to be rotatable around the central axis C of the drive shaft 4.

Each of the wheel bearings 31 and 32 includes a plurality of tapered rollers. In the following description, as a matter of convenience, in a case of distinguishing between the two wheel bearings 31, 32, the wheel bearing disposed at the side of the distal end portion of the axle housing 10 (right side in FIG. 2) is referred to as a first wheel bearing 31, and the wheel bearing disposed at a side of the base end portion of the axle housing 10 (left side in FIG. 2) is referred to as a second wheel bearing 32.

The vehicle wheel 1 is attached to the hub portion 22 of the wheel hub 20. The vehicle wheel 1 includes a tire 1b mounted on an outer peripheral portion of a wheel 1a, and is fastened to an outer peripheral portion of the hub portion 22 via the wheel 1a using a large number of bolts 1c.

In addition, in the power transmission device, a final speed reducer (gear speed reducer) 40 is provided between the wheel hub 20 and the drive shaft 4. The final speed reducer 40 decelerates a rotation of the drive shaft 4 and transmits the rotation to the wheel hub 20, and is formed of a plurality of gears. In the present embodiment, the final speed reducer 40 includes two sets of planetary gear mechanisms serially connected between the drive shaft 4 and the wheel hub 20.

Specifically, a first planetary gear mechanism 45 includes a first sun gear 41, a first ring gear 43, and a plurality of first planetary gears 44. The first sun gear 41 is splined to the drive shaft 4. The first ring gear 43 is splined to an inner peripheral surface of the axle housing 10 via a ring gear hub 42. The first planetary gears 44 are provided so as to mesh with the first sun gear 41 and the first ring gear 43. A second planetary gear mechanism 46 includes a second sun gear 47, a second ring gear 48, and a plurality of second planetary gears 49. The second sun gear 47 is rotatably supported on a distal end portion of the drive shaft 4. The second ring gear 48 is provided in the first ring gear 43. The second planetary gears 49 are provided so as to mesh with the second sun gear 47 and the second ring gear 48. A first planetary carrier 44A of the first planetary gear mechanism 45 rotatably supports a rotation axis of the first planetary gear 44, and meshes with the second sun gear 47 via a tooth portion provided in an inner peripheral portion thereof. A second planetary carrier 49A of the second planetary gear mechanism 46 rotatably supports a rotation axis of the second planetary gear 49, and is attached to the hub portion 22 of the wheel hub 20 via a ring plate 50 provided on an outer peripheral portion thereof. The ring plate 50 is a cylindrical shape of a size covering an outer peripheral portion of the final speed reducer 40, and includes a speed-reducer housing chamber 52 between a cover plate 51 provided at an end surface of the second planetary carrier 49A and the hub portion 22 of the wheel hub 20. The speed-reducer housing chamber 52 is a sealed space provided so as to cover an opening end portion of the axle housing 10, and houses the final speed reducer 40 inside thereof. Although not illustrated in the drawings, oil is stored in the speed-reducer housing chamber 52 in order to lubricate the large number of gears that form the final speed reducer 40. The amount of stored oil is set so that each of the gears is lubricated and the mechanical loss due to the resistance of oil can be minimized.

In the final speed reducer 40, the first ring gear 43 of the first planetary gear mechanism 45 and the second ring gear 48 of the second planetary gear mechanism 46 mesh with the axle housing 10 via the ring gear hub 42. Therefore, when the first sun gear 41 is rotated by the drive shaft 4, the first planetary gear 44 rotates while revolving around the first sun gear 41, and the second sun gear 47 rotates via the first planetary carrier 44A. When the second sun gear 47 rotates, the second planetary gear 49 rotates while revolving around the second sun gear 47, and the second planetary carrier 49A rotates. Accordingly, the wheel hub 20 rotates via the ring plate 50.

Moreover, a brake chamber 60 is provided between the rotation support portion 21 of the wheel hub 20 and the axle housing 10. The brake chamber 60 is an annular-shaped space that includes an attachment flange 12 formed on an outer peripheral surface of a portion at a side of a base end portion of the second wheel bearing 32 in the axle housing 10, and a brake cover member 61 attached to the attachment flange 12. The brake cover member 61 includes a tubular portion 61a and a pair of plate portions 61b. The tubular portion 61a is disposed so as to surround the rotation support portion 21 of the wheel hub 20. Each of the plate portions 61b extends from both end surfaces of the tubular portion 61a toward a direction approaching an outer peripheral surface of the rotation support portion 21. In addition, the brake cover member 61 is attached to the attachment flange 12 via one of the plate portions 61b.

A brake mechanism 70 is housed in the brake chamber 60. The brake mechanism 70 includes a brake piston 71, a plurality of friction plates 72, and a plurality of mating plates 73 alternately superposed over one another. Although not illustrated in the drawings, the brake piston 71 is actuated when oil for braking is supplied to a pressure chamber, and moves forward along the central axis C of the drive shaft 4. When the friction plates 72 and the mating plates 73 are brought into pressure-contact with each other, large friction force acts therebetween. The friction plates 72 mesh with the rotation support portion 21 of the wheel hub 20 via an inner peripheral surface, and the mating plates 73 mesh with the tubular portion 61a of the brake cover member 61 via an outer peripheral surface.

In the brake mechanism 70, when the oil for braking is not supplied to the pressure chamber of the brake piston 71, the brake piston 71 is retreated by a return spring (not illustrated), and the friction plates 72 are in a state rotatable relative to the mating plates 73. Therefore, by applying external force to the wheel hub 20, the wheel hub 20 can be rotated relative to the axle housing 10.

On the other hand, when the oil for braking is supplied to the pressure chamber of the brake piston 71, the brake piston 71 is moved forward, and the friction plates 72 and the mating plates 73 are brought into pressure-contact with each other. As a result, by the friction force acting between the friction plates 72 and the mating plates 73, braking is applied to the rotation of the wheel hub 20 relative to the axle housing 10.

In addition, in the power transmission device, a lubrication space 80 is formed so as to include the brake chamber 60 and the pair of wheel bearings 31, 32, and a circulation passage 90 for supplying the oil to the lubrication space 80 is provided. The lubrication space 80 is a sealed space formed by disposing floating seals 81, 82 at two positions between the axle housing 10 and the wheel hub 20.

In the present embodiment, at an outer peripheral portion of the wheel hub 20, the first floating seals 81 are provided between the plate portion 61b of the brake cover member 61 and a first hub bearing holder 83 provided in the wheel hub 20. In addition, the second floating seals 82 are provided between an axle bearing holder 84 provided in the opening end surface of the axle housing 10 and a second hub bearing holder 85 provided in the hub portion 22 of the wheel hub 20. The first hub bearing holder 83 is a tubular member that extends from the hub portion 22 of the wheel hub 20 along the outer peripheral surface of the rotation support portion 21, and in which a distal end portion thereof is provided so as to approach the plate portion 61b of the brake cover member 61. The axle bearing holder 84 extends from the opening end surface of the axle housing 10 toward an outer peripheral direction, and an outer peripheral portion thereof faces the hub portion 22 of the wheel hub 20 beyond the first wheel bearing 31. The second hub bearing holder 85 is attached to an end surface of the hub portion 22, and is provided so that a distance from the central axis C of the drive shaft 4 is equal to a distance from the central axis C to the first hub bearing holder 83. In other words, the second floating seals 82 provided between the axle bearing holder 84 and the second hub bearing holder 85 have an inner diameter equal to an inner diameter of the first floating seals 81, and blocks the flow of oil between the second floating seals 82 and the speed-reducer housing chamber 52 that houses the final speed reducer 40.

The circulation passage 90 includes a supply passage portion 93 and a discharge passage portion 94. The supply passage portion 93 is a portion for supplying the oil stored in an oil tank 92 to the lubrication space 80 by the driving of a hydraulic pump 91. The discharge passage portion 94 is a portion for returning the oil in the lubrication space 80 to the oil tank 92. More specifically, the supply passage portion 93 of the circulation passage 90 is connected so as to supply the oil to a portion surrounded by the attachment flange 12 of the axle housing 10 and the second wheel bearing 32 in the lubrication space 80. As is apparent from FIG. 3, an oil cooler 95 and an oil filter 96 are provided in the supply passage portion 93. The discharge passage portion 94 of the circulation passage 90 is connected so as to discharge the oil from a portion surrounded by the plate portion 61b of the brake cover member 61 and the mating plates 73 in the brake chamber 60.

In the power transmission device with the structure described above, when the electric motor 3 is driven and the drive shaft 4 is rotated, the wheel hub 20 rotates via the final speed reducer 40; therefore, the working vehicle can travel by the vehicle wheels 1. While the working vehicle is traveling, the oil stored in the speed-reducer housing chamber 52 is agitated by the rotation of the gears that form the final speed reducer 40, thus lubricating the respective portions.

Meanwhile, by supplying the oil for braking to the pressure chamber of the brake piston 71, braking is applied to the rotation of the wheel hub 20 relative to the axle housing 10 by the friction force acting between the friction plates 72 and the mating plates 73; therefore, for example, the traveling working vehicle can be decelerated. During that period, the oil is sequentially circulated and supplied to the lubrication space 80 through the circulation passage 90, thus cooling the brake mechanism 70. Furthermore, according to the power transmission device, since the wheel bearings 31, 32 are also included in the lubrication space 80, the wheel bearings 31, 32 are lubricated by the oil circulated and supplied from the circulation passage 90.

There is a possibility that brake dust is mixed into the oil that has passed through the brake mechanism 70. However, the oil in the lubrication space 80 is constantly purified by the oil filter 96 and further cooled by the oil cooler 95; therefore, the brake mechanism 70 can be cooled without affecting the lifetime of the wheel bearings 31, 32. In addition, the flow of oil between the lubrication space 80 and the speed-reducer housing chamber 52 is blocked by the second floating seals 82; therefore, wear powder generated in the final speed reducer 40 is hardly mixed into the oil. As a result, the lifetime of the wheel bearings 31, 32 can be extended without performing the complicated maintenance work such as frequent replacement of oil.

Moreover, no oil is supplied from the circulation passage 90 to the speed-reducer housing chamber 52 in which the flow of oil from the lubrication space 80 has been blocked by the second floating seals 82. Therefore, a portion immersed in the oil decreases, and the mechanical loss of the final speed reducer 40 due to the resistance of oil can be minimized.

In the embodiment described above, the large dump truck used in off-road such as a mine is an example to which the power transmission device is applicable; however, it is not necessarily limited to the large dump truck, and the power transmission device can be applied to other working vehicles.

In addition, in the embodiment described above, the floating seals 81, 82 are disposed at positions in outer peripheries of the wheel bearings 31, 32, respectively; therefore, the wheel bearings 31, 32 and the floating seals 81, 82 can be overlapped with each other, respectively, in a radial direction and thus, the increase in length of a dimension along the central axis C of the drive shaft 4 can be suppressed. However, the floating seals 81, 82 do not necessarily have to be provided at the outer peripheries of the wheel bearings 31, 32, respectively.

Furthermore, in the embodiment described above, the floating seals 81, 82 are disposed at two positions having the radii from the central axis C of the drive shaft 4 equal to each other; therefore, a thrust force generated on the wheel hub 20 is canceled out by the oil supplied to the lubrication space 80, and it is possible to contribute to the extension of lifetime of the wheel bearings 31, 32. However, the floating seals 81, 82 that have the equal radius do not necessarily have to be used in the present invention.

REFERENCE SIGNS LIST

4 Drive shaft
10 Axle housing
11 Central hole
20 Wheel hub
31, 32 Wheel bearing
40 Final speed reducer
52 Speed-reducer housing chamber
60 Brake chamber
70 Brake mechanism
80 Lubrication space
81, 82 Floating seal
90 Circulation passage
96 Oil filter
C Central axis of drive shaft

The invention claimed is:

1. A power transmission device comprising: an axle housing that has a central hole at a central portion in which a drive shaft is rotatably penetrated; a wheel hub rotatably disposed in an outer peripheral portion of the axle housing via a pair of wheel bearings; a speed-reducer housing chamber provided in the wheel hub in a manner covering an opening end portion of the axle housing; a gear speed reducer that is formed inside the speed-reducer housing chamber, and decelerates a rotation of the drive shaft and transmits the rotation to the wheel hub; and a wet-type brake mechanism housed in a brake chamber formed between the axle housing and the wheel hub, and actuated such that braking is applied to a rotation of the wheel hub relative to the axle housing, wherein floating seals are disposed between a lubrication space, including the brake chamber and the pair of wheel bearings, and the speed-reducer housing chamber, and a circulation passage for oil that includes an oil filter is connected to the lubrication space wherein the wet-type brake mechanism and the floating seals are disposed between the pair of wheel bearings in a direction parallel to a central axis of the drive shaft.

2. The power transmission device according to claim 1, wherein the floating seals are disposed at positions in an outer periphery of the wheel bearing.

3. The power transmission device according to claim 2, wherein the floating seals are disposed in two positions having radii from a central axis of the drive shaft equal to each other.

4. A power transmission device comprising: an axle housing that has a central hole at a central portion in which a drive shaft is rotatably penetrated; a wheel hub rotatably disposed in an outer peripheral portion of the axle housing via a pair of wheel bearings; a speed-reducer housing chamber provided in the wheel hub in a manner covering an opening end portion of the axle housing; a gear speed reducer that is formed inside the speed-reducer housing chamber, and decelerates a rotation of the drive shaft and transmits the rotation to the wheel hub; and a wet-type brake mechanism housed in a brake chamber formed between the axle housing and the wheel hub, and actuated such that braking is applied to a rotation of the wheel hub relative to the axle housing, wherein the brake chamber is formed in an outer peripheral portion of the wheel hub by providing a brake cover member in the axle housing, a lubrication space, including the brake chamber and the pair of wheel bearings, is formed by disposing first floating seals between the brake cover member and the wheel hub, and second floating seals between an opening end portion, facing the speed-reducer housing chamber in the axle housing, and the wheel hub, and a circulation passage for oil that includes an oil filter is connected to the lubrication space, wherein the wet-type brake mechanism and the first floating seals are disposed between the pair of wheel bearings in a direction parallel to a central axis of the drive shaft.

* * * * *